US011611933B2

(12) United States Patent
Jayaraman et al.

(10) Patent No.: US 11,611,933 B2
(45) Date of Patent: Mar. 21, 2023

(54) MANAGING STATION CONNECTIVITY IN MICROCELL WI-FI ENVIRONMENT ON A DATA COMMUNICATION NETWORK

(71) Applicant: Fortinet, Inc., Sunnyvale, CA (US)

(72) Inventors: Mohan Jayaraman, Bangalore (IN); P C Sridhar, Bangalore (IN); Pradeep Mohan, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 37 days.

(21) Appl. No.: 17/217,344

(22) Filed: Mar. 30, 2021

(65) Prior Publication Data
US 2022/0322224 A1  Oct. 6, 2022

(51) Int. Cl.
| | | |
|---|---|---|
| *H04W 48/20* | (2009.01) | |
| *H04B 17/318* | (2015.01) | |
| *H04W 24/10* | (2009.01) | |
| *H04W 76/25* | (2018.01) | |

(52) U.S. Cl.
CPC .......... *H04W 48/20* (2013.01); *H04B 17/318* (2015.01); *H04W 24/10* (2013.01); *H04W 76/25* (2018.02)

(58) Field of Classification Search
CPC ... H04W 48/005; H04W 48/16; H04W 24/10; H04W 48/10; H04W 48/20; H04W 76/25; H04B 17/327; H04B 17/318
See application file for complete search history.

(56) References Cited

U.S. PATENT DOCUMENTS

| | | | | |
|---|---|---|---|---|
| 8,082,347 | B2* | 12/2011 | Abdelhamid | H04W 48/20 709/227 |
| 9,071,993 | B1* | 6/2015 | Duo | H04W 28/0236 |
| 10,892,965 | B2* | 1/2021 | Ringland | H04L 41/082 |
| 2004/0063455 | A1* | 4/2004 | Eran | H04W 92/20 455/525 |
| 2010/0046452 | A1* | 2/2010 | Kim | H04L 61/5084 370/329 |
| 2012/0081249 | A1* | 4/2012 | Kaiser | H04W 64/00 342/174 |
| 2013/0182611 | A1* | 7/2013 | Kneckt | H04W 36/0061 370/255 |
| 2014/0003286 | A1* | 1/2014 | Estevez | H04W 48/02 370/254 |
| 2014/0334447 | A1* | 11/2014 | Kim | H04W 36/0058 370/331 |
| 2015/0092555 | A1* | 4/2015 | Tam | H04W 84/12 370/235 |

(Continued)

*Primary Examiner* — Jean A Gelin
(74) *Attorney, Agent, or Firm* — Law Office Of Dorian Cartwright; Dorian Cartwright

(57) ABSTRACT

In a microcell environment, access points with a probe-if-assigned setting configured to delay probe responses to probe requests is registered and managed by a Wi-Fi controller. Probe requests are received and forwarded from at least two of the plurality of access points from a specific station attempting to connect to the Wi-Fi communication network. A Wi-Fi assignment module receives RSSI measurements from the at least two access points with respect to the specific access point, during a delay from the probe-if-assigned setting. A specific access point is assigned to the specific station for sending a probe response once a delay period expires.

5 Claims, 5 Drawing Sheets

(56) References Cited

U.S. PATENT DOCUMENTS

| | | | |
|---|---|---|---|
| 2015/0121529 A1* | 4/2015 | Quinlan | H04W 12/121 |
| | | | 726/23 |
| 2016/0112944 A1* | 4/2016 | Zhou | H04W 12/06 |
| | | | 370/338 |
| 2016/0255661 A1* | 9/2016 | Siraj | H04W 48/20 |
| | | | 370/338 |
| 2017/0272317 A1* | 9/2017 | Singla | H04L 41/12 |
| 2017/0295575 A1* | 10/2017 | Rison | H04W 72/0453 |
| 2020/0322039 A1* | 10/2020 | Dong | H04W 72/0453 |
| 2020/0396019 A1* | 12/2020 | Lumbatis | H04W 64/006 |
| 2021/0127307 A1* | 4/2021 | Huang | H04W 16/18 |
| 2021/0400566 A1* | 12/2021 | Taskin | H04W 48/14 |
| 2022/0007366 A1* | 1/2022 | Panje | H04W 24/08 |

* cited by examiner

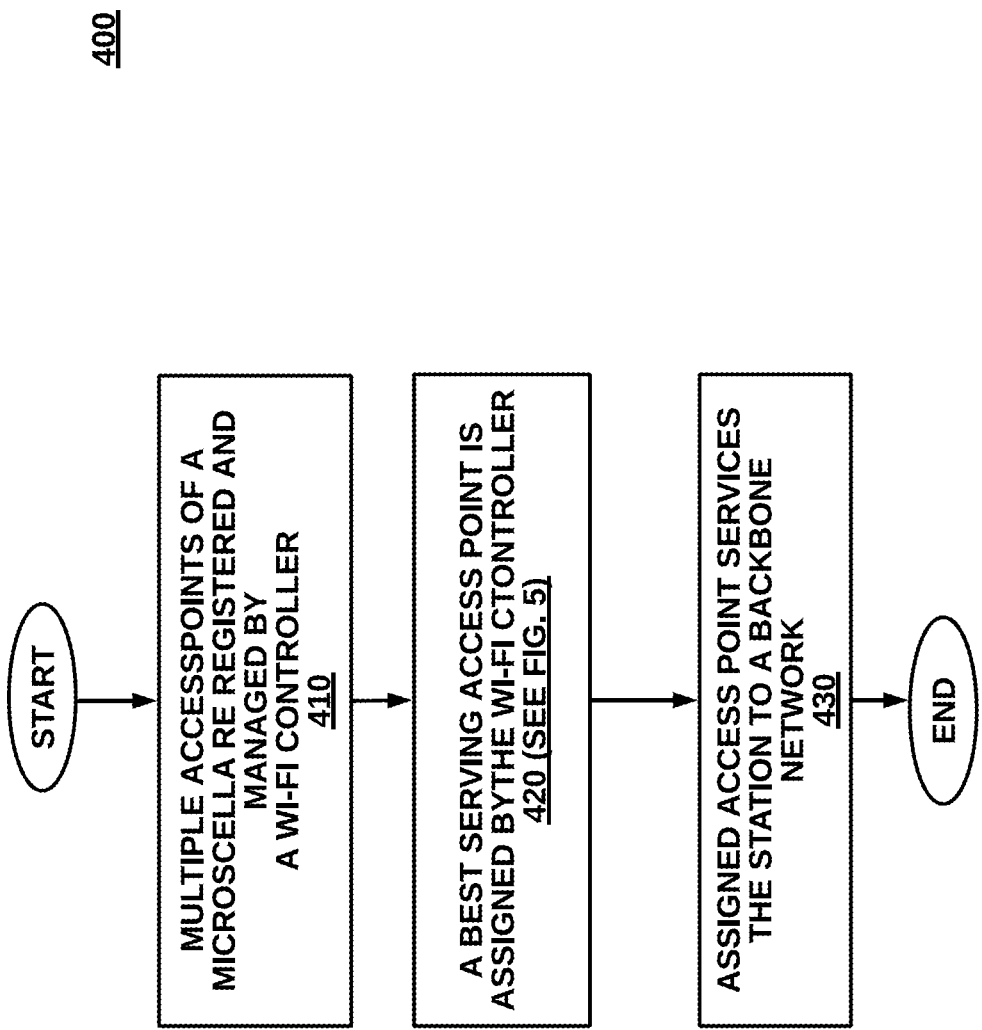

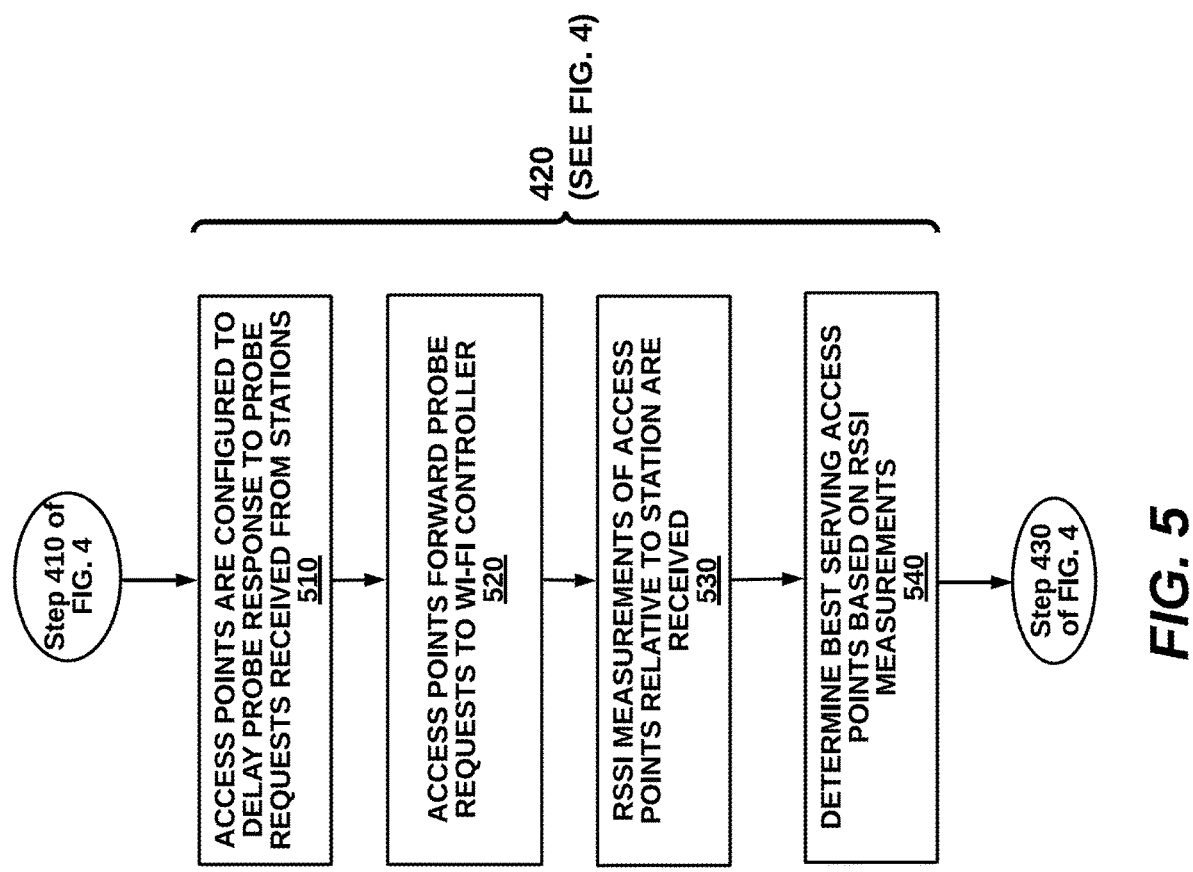

MANAGING STATION CONNECTIVITY IN MICROCELL WI-FI ENVIRONMENT ON A DATA COMMUNICATION NETWORK

FIELD OF THE INVENTION

The invention relates generally to computer networking, and more specifically, managing station connectivity in a microcell Wi-Fi environment on a data communication network.

BACKGROUND

In a microcell WiFi environment, access points are configured in different channels and placed accordingly to avoid interference on co-channels as well as adjacent channels. Each access point serving the same ESSID will have its own unique BSSID. A WiFi station wanting to connect to the available ESSID in a microcell environment sends a broadcast probe request to which it receives multiple probe responses from multiple access points and the station connects to a chosen access point.

Problematically, stations rather than networks control connections to access points. Balance of the network as a whole is not possible when end points control connections. The problem is exacerbated by the increasing number of mobile devices and the number of devices in general that connect to the network on their own accord.

What is needed is a robust technique for managing station connectivity in a microcell Wi-Fi environment on a data communication network.

SUMMARY

To meet the above-described needs, methods, computer program products, and systems for managing station connectivity in a microcell Wi-Fi environment on a data communication network.

In one embodiment, a microcell environment with a plurality of access points with a probe-if-assigned setting configured to delay probe responses to probe requests is registered and managed by a Wi-Fi controller. The access points can have unique SSIDs broadcasting on different channels. Probe requests are received and forwarded from at least two of the plurality of access points from a specific station attempting to connect to the Wi-Fi communication network. Also, stations including a specific station attempting connection are tracked over connections to more than one of the plurality of access points.

In another embodiment, a Wi-Fi assignment module receives RSSI measurements from the at least two access points with respect to the specific access point, during a delay from the probe-if-assigned setting. Delayed probe requests will have time to be received so that an optimal selection can be made between the access points. A specific access point is assigned to the specific station for sending a probe response once a delay period expires.

Advantageously, network performance (e.g., data rate) is improved due to better assignments of stations to best-serving access points. In turn, computer performance is improved by better network connections.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 4 is a high-level flow chart illustrating a method for managing station connectivity in a microcell Wi-Fi environment on a data communication network, according to one embodiment.

FIG. 5 is a more detailed flow chart illustrating a step of assigning best-serving access points in microcells of the method of FIG. 4, according to an embodiment.

DETAILED DESCRIPTION

Methods, computer program products, and systems for managing station connectivity in a microcell Wi-Fi environment on a data communication network.

Figure 1:
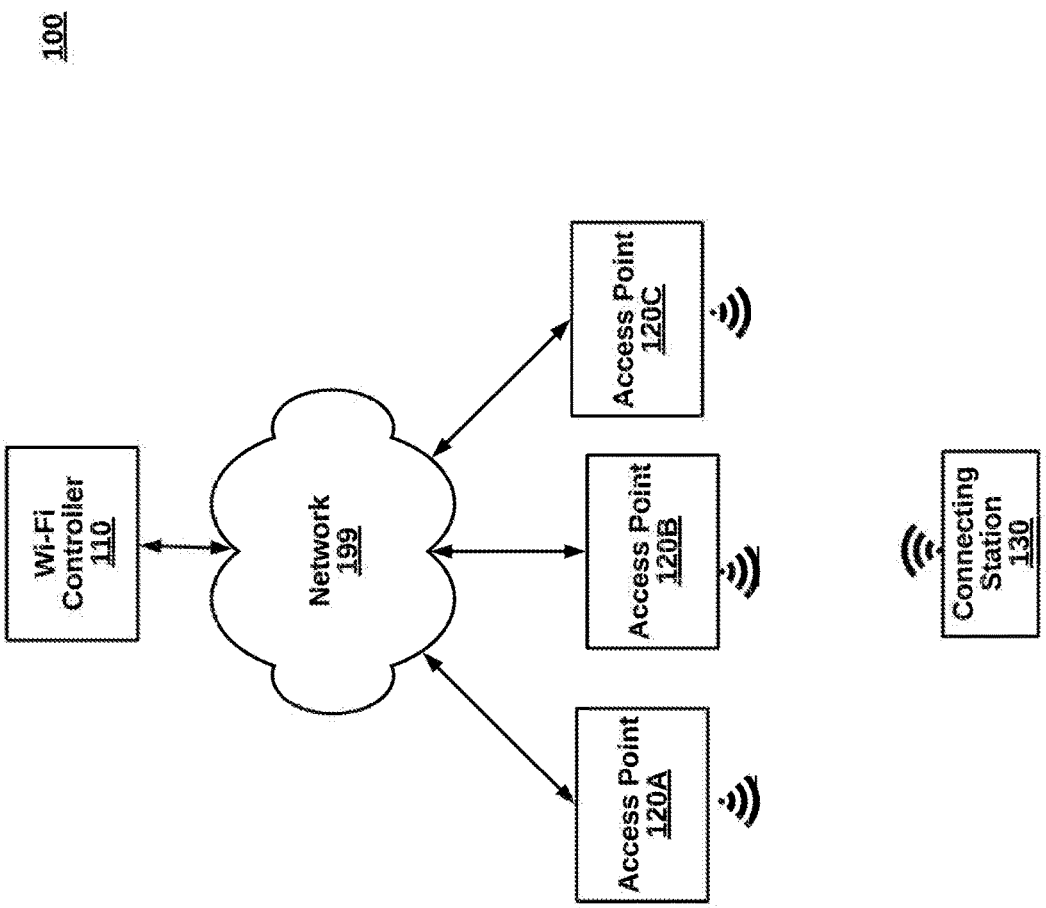
FIG. 1 is a high-level block diagram illustrating a system for managing station connectivity in a microcell Wi-Fi environment on a data communication network, according to one embodiment.
Figure 3:
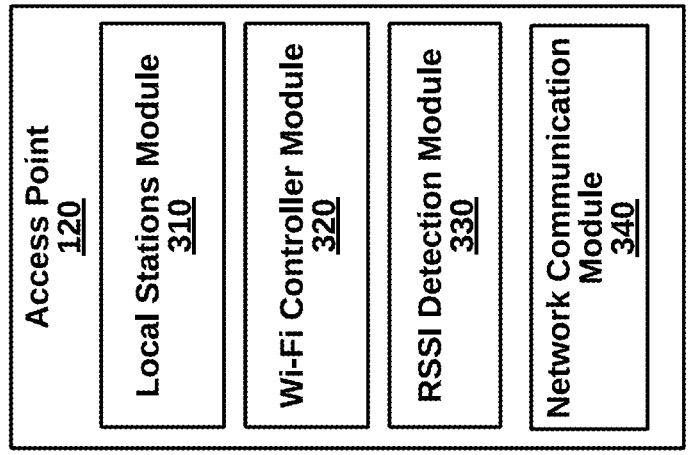
FIG. 3 is a more detailed block diagram illustrating an example access point of the access point of FIG. 1, according to an embodiment.
Figure 2:
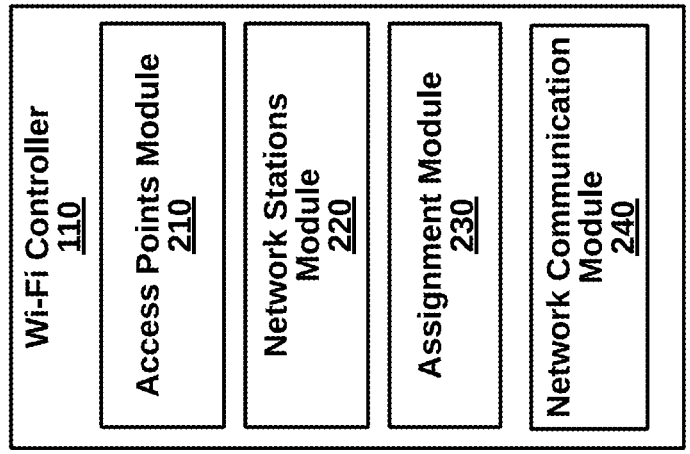
FIG. 2 is a more detailed block diagram illustrating an example Wi-Fi controller of the system of FIG. 1, according to one embodiment.

Systems for Wi-Fi Connectivity Management (FIGS. 1-3)

Figure 6:
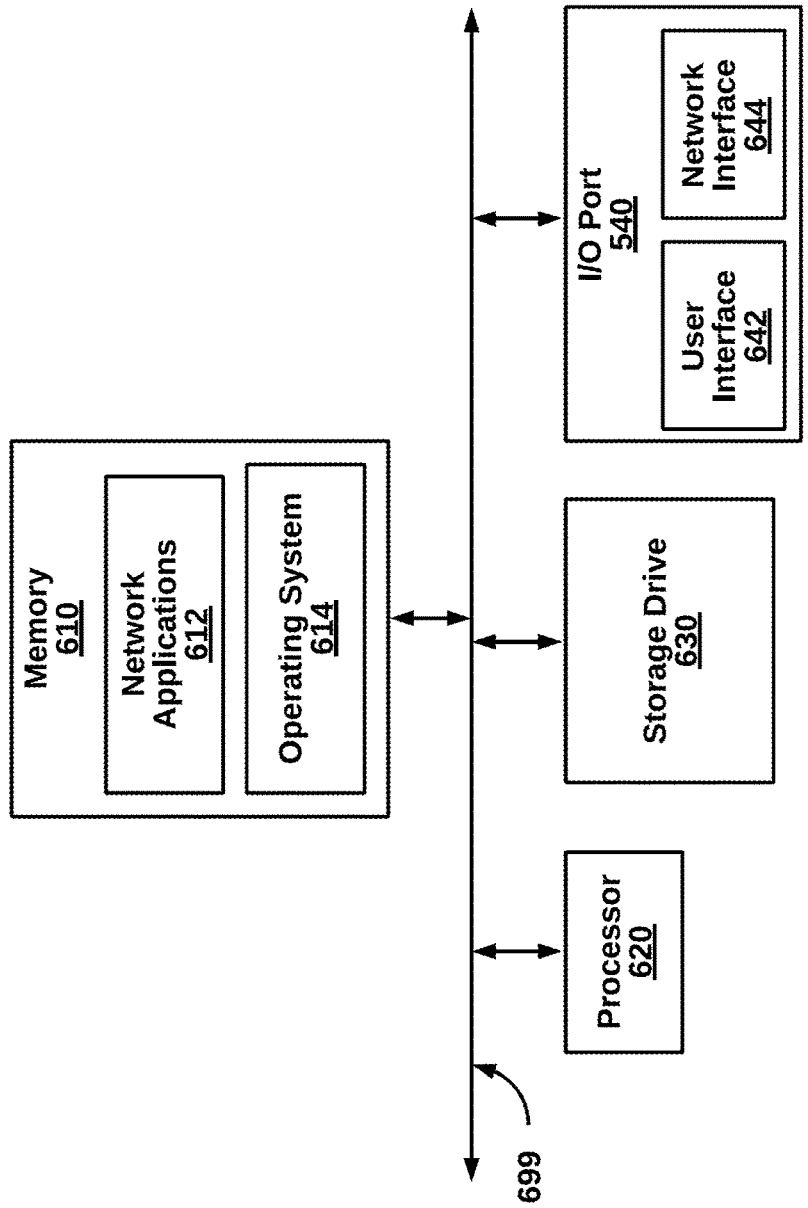
FIG. 6 is a block diagram illustrating an example computing device, according to one embodiment.

FIG. 1 is a high-level block diagram illustrating a system 100 for RU-based medium access control for managing station connectivity in a microcell Wi-Fi environment on a data communication network, according to one embodiment. The system 100 includes a Wi-Fi controller 110, access points 120A-C and station 130, communicatively coupled to a data communication network 199. Many other embodiments of the system 100 besides the present use case are possible. For example, there can be multiple Wi-Fi controllers, more or less access points and multiple stations. Further, there can be components with additional functionalities, such as gateways, firewalls, routers, switches, and the like. Components can be implemented in hardware, software or a combination of both, one example of which is shown in FIG. 6.

The data communication network 199 links components of the system 100 with a channel for data communication. The Wi-Fi controller 110 and the access points 120A-C, are preferably connected to the data communication network 199 network via hardwire. The station 130 is wirelessly connected to the access points 120A-C to access the data communication network 199 indirectly. The data communication network 199 can be the Internet, a WAN, a LAN, WLAN, a cellular network (e.g., 3G, 4G or 5G), or a hybrid of different types of networks. Thus, the system 100 can be local or include cloud-based devices. Data packets include header and data fields, the header fields including metadata for source, destination and other parameters. The IEEE 802.11 protocols specify offsets for certain fields (e.g., BSSID field)

The Wi-Fi controller 110, in one embodiment, delays responses from access points to connection requests from stations, in order to improve network-side control of which access point best serves a particular station. More generally, the network-side control refers to wired backend network controls on a first network input/output of an access point.

Rather than using a first-come-first-serve assignment algorithm for selecting an access point, the Wi-Fi controller 110 sets a probe-if-assigned configuration on each of the Wi-Fi access points 120A-C to cause, for example, to not respond until instructed, or to implement a delay in responding. During this time delay, each of the requests forwarded upstream to the Wi-Fi controller 110 can be analyzed as a group. Several different embodiments of selection algorithms can be implemented. A response is then sent to a selected access point of the multiple access point. Only the selected access point, in turn, responds to the initial probe request while the others remain silent.

In other embodiments, the Wi-Fi controller 110 performs other management tasks, such as tracking station connections at different times and at different times including roaming stations with subsequent connections while moving to different locations. In another example, stations can disconnect or pause a Wi-Fi connection while making use of data transfers through a cellular data connection and then returning to the pre-existing Wi-Fi connection. Additionally, the Wi-Fi controller 110 can track users across different connecting devices. Policies can be kept uniform to users and devices beyond a single connection. Some systems include multiple Wi-Fi controllers 110 either to split functionalities or to load balance larger networks.

The access points 120A-C receive connection requests from stations and forwards to the Wi-Fi controller 110. When the station 130 chooses a particular access point to send a probe request, the other access points may still pick up the signal and send the information upstream for analysis. However, if the channels are orthogonal or non-overlapping, only one access point may pick up the probe request. Responses to the request are suppressed unless further direction is received from the Wi-Fi controller 110 to do so. For instance, a CLI (command line interface) accessed manually by a network administrator or API (application programming interface) accessed automatically by the Wi-Fi controller 110 enables forwarding of probe request. A number of probes being forwarded can also be limited, as a saved configuration. Forwarding can also be disabled if necessary.

In more detail, the access points 120A-C can periodically broadcast advertisement frames to notify stations within RF range that network services are available. In response, a probe request is received from the station 130 when a new or updated connection is desired by the station. Typically, access points initiate authentication processes to determine whether the station 130 verify identities, but the probe-if-assigned setting delays this process either temporarily or until instruction from the Wi-Fi controller 110 is received.

In an implementation, a microcell environment is configured such that each of the access points 120A-C has a unique SSID operating on a non-overlapping channel, to prevent interference caused by close locations.

The station 130 uses RF signaling to receive advertisements broadcast by nearby access points and initiate a connection with a probe request. In the case of FIG. 1, multiple access points are available, causing the station 130 to make a self-serving choice on which to connect. The selection can be based on RSSI strength, available services, historical connections, or the like. In one example, the station sends a probe request received by each of the access points 120A-C. The measured RSSI strength between the station 110 and the access point 120A is −35 dB, between the access point 120B is −45 dB and the access point 120C is −75 dB. Once a probe response is received from an access point selected by the Wi-Fi controller 110, the station 130 can begin authentication (e.g., through a RADIUS service).

In some implementations, the station 130 authenticates with a preferred access point before the network-selected access point takes over servicing.

The station 130 can be mobile or stationary. Wi-Fi can be one of many wireless communication capabilities, along with cellular and Bluetooth, for instance.

FIG. 2 is a more detailed block diagram illustrating Wi-Fi controller 110 of the system 100, according to an embodiment. The components can be implemented in hardware, software, or a combination of both. The Wi-Fi controller 110 include an access points module 210 to register, monitor and manage access points on the network, for instance, when access points power up, power down, reboot, freeze, move from one location to another, respond to probe requests, and have network security threats. The access points module 210 can store and maintain tables so that when forwarded probe requests are received, they can be matched to a particular access point. The access points module 210, upon assignment of a particular one of many access points to a station, can update internal tables and instruct the selected access point to respond to the station. The other stations, one case, are notified by the access points module 210 to ignore further communications from the station 130. One embodiment of the access points module 210 also handles forwarding and delay configurations of the access points.

A network stations module 220 can register a station at a first access point and maintain uniform network treatment as the station roams to a second or third access point. The Wi-Fi controller 110 can also force hand-offs for stations driving stations to a different access point. A table or record can track each station over time.

An assignment module 230 receives the forwarded probe requests from different access points originating from the station 130. A period is set for collecting probes, for instance, 200 ms, or as otherwise configured. Upon expiration of the period, an assignment algorithm determines which of the access points will be selected for serving the station 130. Tables are updated for the assignment, and notifications are sent by the access point module 210 with instructions.

Finally, the network communication module 240 provides communication protocols, software and hardware for network communication. Other implementations include additional modules for user accounts, network policy or network security, for example.

FIG. 3 is a more FIG. 2 is a more detailed block diagram illustrating an access point 120 (collectively representing any one of 120A-C) of the system 100 of FIG. 1, according to one embodiment. A local stations module 310 handles connections with stations being serviced with backbone connectivity by generating beacons to advertise services, responding to probe requests and implementing authentication protocols for the station 130. A Wi-Fi controller module 320 facilitates communications with the Wi-Fi controller 110 for configuration of the access point 120, probe request forwarding, and receiving instructions from the Wi-Fi controller 110.

An RSSI detection module 330 measures signal strength of connected stations, for example, by flight time of data packets. A station can have different RSSI measurements to different access points, and connection decisions can be made based on station uplink station capabilities in combination with RSSI measurements. Even if an RSSI measurement between a station and a particular access point is stronger than others, depending on a weighting algorithm, assignment can be made to a different access point with a weaker RSSI measurement to the station. Other variations consider additional factors such as local airtimes fairness of an access point and network conditions.

Finally, the network communication module 240 provides communication protocols, software and hardware for Wi-Fi and Ethernet network communication.

Methods for Wi-Fi Connectivity Management (FIG. 4-5)

FIG. 4 is a high-level flow diagram illustrating a method 400 for managing station connectivity in a microcell Wi-Fi environment on a data communication network, according to one embodiment. The method 400 can be implemented by, for example, the access points 120A-C of FIG. 1, or other network devices. The steps of the method can be performed as shown or in different orders, with additional steps included, over various embodiments.

At step 410, multiple access points are registered and managed by a Wi-Fi controller, along with stations connected to the access points. At step 420, a best-serving access point of a microcell is assigned by the Wi-Fi controller. At step 430, the assigned access point services the station.

Returning to a more detailed example for the assignment step 420, in FIG. 5, at step 510, the access points are configured with a probe-if-assigned setting configured to delay probe responses to probe requests. At step 520, probe requests forwarded from at least two of the plurality of access points from a specific station attempting to connect to the Wi-Fi communication network are received. At step 530, RSSI measurements from the at least two access points with respect to the specific access point, during a delay from the probe-if-assigned setting are received. At step 540, a specific access point to the specific station for sending a probe response based on a highest RSSI measurements is assigned. Other variations are possible, taking into account factors such as load balancing, access point congestion, and signal interference.

Generic Wi-Fi Connectivity Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, such as the Wi-Fi controller 110, the access points 120A-C and the station 130. Additionally, the computing device 600 is merely an example implementation itself, since the system 100 can also be fully or partially implemented with laptop computers, tablet computers, smart phones, Internet appliances, and the like.

The computing device 600, of the present embodiment, includes a memory 610, a processor 620, a hard drive 630, and an I/O port 640. Each of the components is coupled for electronic communication via a bus 699. Communication can be digital and/or analog, and use any suitable protocol.

The memory 610 further comprises network applications 612 and an operating system 614. The network applications 620 can include the modules of network applications. Other network applications can include 612 a web browser, a mobile application, an application that uses networking, a remote application executing locally, a network protocol application, a network management application, a network routing application, or the like.

The operating system 614 can be one of the Microsoft Windows® family of operating systems (e.g., Windows 95, 98, Me, Windows NT, Windows 2000, Windows XP, Windows XP x64 Edition, Windows Vista, Windows CE, Windows Mobile, Windows 6 or Windows 10), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general-purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.ac and 802.11ax, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, Layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A Wi-Fi controller coupled in communication with a data communication network and coupled in communication with a plurality of access points providing a Wi-Fi communication network, for managing station connectivity in a microcell environment, the Wi-Fi controller comprising:
   a processor;
   a network interface, communicatively coupled to the processor and to the data communication network; and
   a memory device, communicatively coupled to the processor and to the network interface, the memory device storing code that when executed by the processor, comprises:
   an access point management module to register and manage the plurality of access points with a probe-if-assigned setting configured to delay probe responses to probe requests, and to receive probe requests forwarded from at least two of the plurality of access points from a specific station attempting to connect to the Wi-Fi communication network;
   a station management module to track a plurality of stations including the specific station over connections to more than one of the plurality of access points; and
   a Wi-Fi assignment module to receive RSSI (radio signal strength indicator) measurements from the at least two access points with respect to the specific access point, during a delay from the probe-if-assigned setting, and to assign a specific access point to the specific station for sending a probe response based on the RSSI measurements.

2. The access point of claim 1, wherein the at least two access points each have a unique SSID (service set identifier).

3. The access point of claim 1, wherein the at least two access points each operate on different, non-overlapping radio channels.

4. A computer-implemented method in an access point of a network security system, coupled in communication with a data communication network and coupled in communication with a Wi-Fi communication network, the method for managing station connectivity in a microcell environment, the method comprising:
   registering and managing the plurality of access points with a probe-if-assigned setting configured to delay probe responses to probe requests;
   tracking a plurality of stations including the specific station over connections to more than one of the plurality of access points;
   receiving probe requests forwarded from at least two of the plurality of access points from a specific station attempting to connect to the Wi-Fi communication network;
   receiving RSSI (radio signal strength indicator) measurements from the at least two access points with respect to the specific access point, during a delay from the probe-if-assigned setting; and
   assigning a specific access point to the specific station for sending a probe response based on the RSSI measurements.

5. A non-transitory computer-readable media storing source code, in an access point of a network security system, coupled in communication with a data communication network and coupled in communication with a Wi-Fi communication network, when the source code is executed by a processor, the access point performs a method in an access point of a network security system, coupled in communication with a data communication network and coupled in communication with a Wi-Fi communication network, the method for managing station connectivity in a microcell environment, the method comprising:
   registering and managing the plurality of access points with a probe-if-assigned setting configured to delay probe responses to probe requests;

tracking a plurality of stations including the specific station over connections to more than one of the plurality of access points;
receiving probe requests forwarded from at least two of the plurality of access points from a specific station attempting to connect to the Wi-Fi communication network;
receiving RSSI (radio signal strength indicator) measurements from the at least two access points with respect to the specific access point, during a delay from the probe-if-assigned setting; and
assigning a specific access point to the specific station for sending a probe response based on the RSSI measurements.

* * * * *